United States Patent Office 3,439,713
Patented Apr. 22, 1969

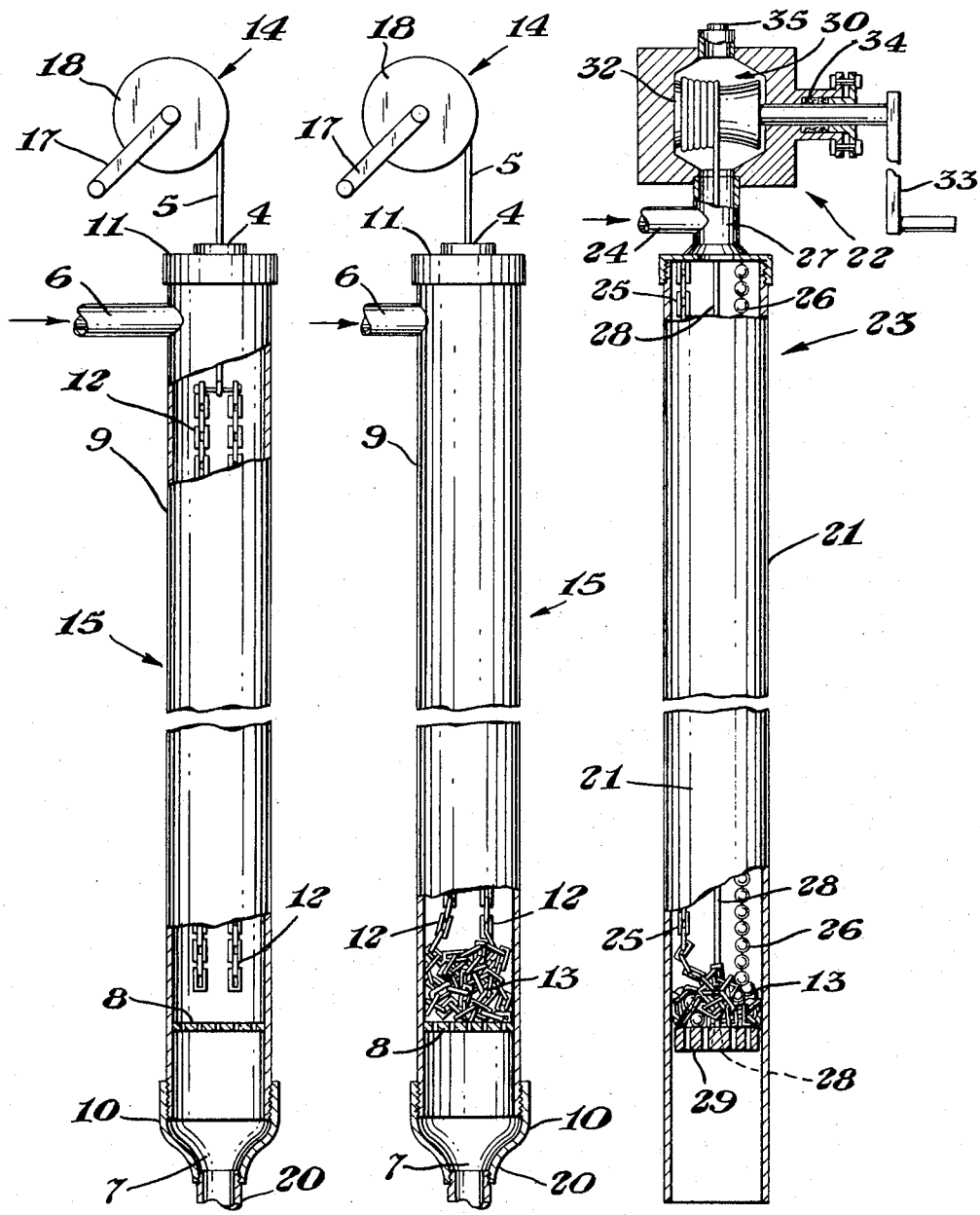

3,439,713
PRESSURE REDUCING VALVE
Melvin F. Katzer, Danville, Calif., assignor to The Dow Chemical Company, Midland, Mich., a corporation of Delaware
Filed June 13, 1966, Ser. No. 557,133
Int. Cl. F15d 1/10
U.S. Cl. 138—43                                    7 Claims The present invention concerns an apparatus for achieving pressure reduction in a flowing liquid. The apparatus is particularly useful as applied to liquid solutions of high polymers.

Occasionally, it becomes necessary to reduce the pressure on a liquid polymer solution. Techniques for reducing the pressure on liquids are well known. They include throttling the liquid through an orifice or any convenient valve. It has been discovered, however, that regardless of whether an orifice, nozzle, or adjustable valve such as a gate, globe, angle, spiral or pinch valve is used in reducing the pressure on a polymer solution, degradation of dissolved polymer results when the pressure of the solution is decreased significantly across the pressure reducing device. This degradation is evidenced by a viscosity loss in the polymer solution. Many other properties are also affected. For instance, degradation of the polymer can adversely affect its usefulness as a mobility control agent in a water flooding medium for the secondary recovery of oil. The degraded polymer is also less efficient as a thickener or flocculating agent.

In a previous invention, a method was provided for minimizing molecular degradation of polymers during pressure reduction on their solutions by passing the solutions through a porous bed. This increases the length of the pressure reduction gradient in the direction of flow. In the present invention, a novel and most useful apparatus and method are set forth for achieving variable pressure reduction in flowing liquids over an extended flow path.

In brief, the apparatus of the invention comprises a valve housing defining a liquid flow path and means for introducing into the liquid flow path chain-bundles of variable lengths. This is achieved by providing a chain-stacking seat and a chain within the liquid flow path adapted for relative movement thereof to form chain-bundles in the valve housing. The chain is disposed toward the inlet of the valve housing relative to the chain-stacking seat. The apparatus of the invention will be more particularly described with reference to the accompanying drawings in which:

FIGURE 1 is a schematic illustration of a valve in accordance with the invention with a fully extended chain, that is, the valve is completely open.

FIGURE 2 shows the same valve partially closed, i.e., with a chain-bundle, through which a desired pressure reduction is achieved.

FIGURE 3 illustrates an assembly incorporating the valve of the invention in which the chain controlling mechanism is partially enclosed and only rotational motion is used in communicating operating force from the exterior to the interior of the valve. Also, in this embodiment a different means is shown for forming chain-bundles.

In FIGURES 1 and 2, a pipe 9, with end cap 11 and reducing coupling 10, form a valve housing 15 having an inlet 6 and an outlet 7. The valve housing 15 is coupled to a well casing 20 by means of the reducing coupling 10.

Within the valve housing 15 are flexible lengths of chain 12. One or more lengths of chain may be used. Along the interior liquid flow path defined by the valve housing 15 near the outlet thereof is a chain-stacking seat 8 in the form of a perforated plate through which liquid readily flows. This provides a stacking base for forming a chain-bundle 13 of the chain 12. The lengths of chain 12 are suspended from their upstream end, i.e. the end in the direction of the inlet of the valve housing 15 from the cable 5. Cable 5 is connected at its other end to actuating means 14 for raising or lowering it relative to the chain-stacking seat 8. Although any convenient means can be used, the illustrated actuating means 14 is a winch consisting of a drum 18 manually operated by a crank 17. The cable 5 enters the interior of the valve housing 15 through a packing gland 4, which is rigidly seated in cap 11. By lowering the cable 5, chain 12 is deposited on the chain-stacking seat 8 to provide a chain-bundle 13. The length of the chain-bundle 13, which is in effect a porous bed, determines for a given liquid and flow rate, the pressure reduction on the liquid across the valve.

In FIGURE 3, another embodiment of the invention is shown in an assembly for direct application to well injection purposes. In this embodiment, a valve housing 23 consists of a pipe 21, which in this particular instance is also the well casing or tubing. The top of the valve housing 23 is formed by a winch-housing 22 and wellhead cap 27. The winch-housing 22 is attached to the valve housing 23 through the wellhead cap 27, which has an inlet 24. Fastened to the wellhead cap 27 are flexible lengths of link and bead chains 25 and 26, respectively. In the illustrated assembly, these lengths of chain extend down into the pipe 21.

In the winch-housing 22 is a winch assembly 30 comprising a cable drum 32 in an alignment permitting movement of an attached cable 28 through the wellhead cap 27. The cable drum 32 is rotated by means of a crank 33 which enters the winch-housing 22 through a packing-gland assembly 34. At the top of the winch-housing 22 is an inspection plug 35. As the cable drum 32 is rotated, the cable 28 is raised or lowered, depending on the direction of rotation, correspondingly moving the chain-stacking seat 29 relative to the chain lengths 25. In this manner, a chain-bundle 13 is formed of sufficient lengths to achieve a desired pressure reduction in any liquid flowing through the chain valve.

As employed herein, the word "chain" refers to a flexible interconnected series of links. The links may take any physical shape such as beads, rings, bars, disks and the like. Any convenient material of construction insoluble in the liquid to be depressurized can be used. Illustratively, chains may be made of plastic, metal, or ceramic materials. Preferably, chain links are of approximately equal size and shape to permit uniform packing or stacking of the chains. However, if desired, a particular chain or chains may have links of random sizes and shapes or in prescribed order of shapes and sizes which produce a bed of given porosity. Moreover, it is manifest that any number of chain lengths that can be fitted into the conduit housing can be utilized to form the chain-bundles.

Similarly, means for extending the chain, or forming the chain-bundles, will include any of a wide variety of mechanical means for retrieving or releasing cable, or if desired, the chains themselves. Either the chains will be movable as in FIGURES 1 and 2 or the stacking seats can be moved relative to the chains as in FIGURE 3.

As will be apparent, the pressure drop achieved with a particular valve construction as applied to a given flowing liquid will depend upon the type of chain used, i.e. the porosity of the chain-bundle and the height or length of the chain-bundle. There will be a characteristic permeability for each different kind of chain. Some will pack tightly and others loosely. For a given unit of flow rate, e.g. gallons per minute per square inch, or linear velocity, there will be a given pressure gradient for each type of chain. Preferably this gradient should not exceed 25 p.s.i. per foot of length, when reducing pressure on high molecular weight polymer solutions. Under these conditions a chain-bundle of 10 feet or longer should be used to dissipate 250 p.s.i.

If a flow rate (gallons per minute) must be increased, a larger diameter valve housing conduit could be used to reduce the pressure gradient and thus avoid polymer degradation. If a larger diameter pipe or valve housing is not possible, then a more permeable chain link could be used so that, at a given flow rate, the pressure drop per unit of bed length is reduced, i.e. the pressure gradient reduced.

Although the invention has been illustrated showing the valves operated in an essentially vertical position, the valves will also operate in any position of rotation, if the liquid flow rate through the valve is sufficient to stack, i.e. compact the chain against the chain-stacking seat. When the liquid flow rate or the buoyancy of the chain is relied upon to maintain the chain against the chain-stacking seat, the valve can even be operated in an inverted position. Preferably, however, the valves will be operated in an essentially upright position, with the inlet at the top, to minimize the effects of variable flow rates.

It will be apparent to those skilled in the art that the apparatus of the present invention, in addition to providing a highly effective means for reducing pressure on flowing liquid solutions, also can be used as a filter for liquid suspensions of solids in which the filter bed, i.e. the stacked chains, may be cleaned and readily reconstituted as needed.

What is claimed is:

1. An apparatus comprising a valve housing with an inlet and outlet defining a liquid flow path, a chain-stacking seat and a chain within the valve housing along said flow path, said chain being disposed toward the inlet thereof relative to the chain-stacking seat; said stacking seat and said chain being connected to means for moving one relative to the other to cause stacking or unstacking of the chain on said chain-stacking seat.

2. An apparatus as in claim 1 wherein the means for moving either the chain or the stacking seat relative to the other, comprises a winch operated cable.

3. An apparatus as in claim 2 wherein the cable and winch cable drum are contained within the valve housing.

4. An apparatus as in claim 1 wherein the chain is composed of interlinking loops.

5. An apparatus as in claim 1 wherein the chain is a string of disks.

6. An apparatus comprising a valve housing defining a liquid flow path, a chain-stacking seat attached to the valve housing along said flow path and a chain within the valve housing connected to means for stacking or unstacking the chain on said chain-stacking seat to form a pressure reducing chain-bundle, said chain being disposed toward the inlet of the valve housing relative to the chain-stacking seat.

7. An apparatus comprising a valve housing defining a liquid flow path, a chain attached at one end to the valve housing at its inlet end and a chain-stacking seat disposed within the conduit housing downstream from the point of attachment of the chain to the housing, said chain-stacking seat being connected to means for moving it relative to the chain to cause stacking or unstacking of the chain on said chain-stacking seat to form a pressure reducing chain-bundle.

References Cited
UNITED STATES PATENTS

| | | | |
|---|---|---|---|
| 2,304,689 | 12/1942 | Hanson | 138—42 |
| 2,949,934 | 8/1960 | Schrenk | 138—42 XR |
| 3,320,971 | 5/1967 | Hemenway | 138—42 XR |
| 3,361,162 | 1/1968 | Prestridge | 138—43 XR |

LAVERNE D. GEIGER, *Primary Examiner.*

BRADFORD KILE, *Assistant Examiner.*